United States Patent Office 3,240,015
Patented Mar. 15, 1966

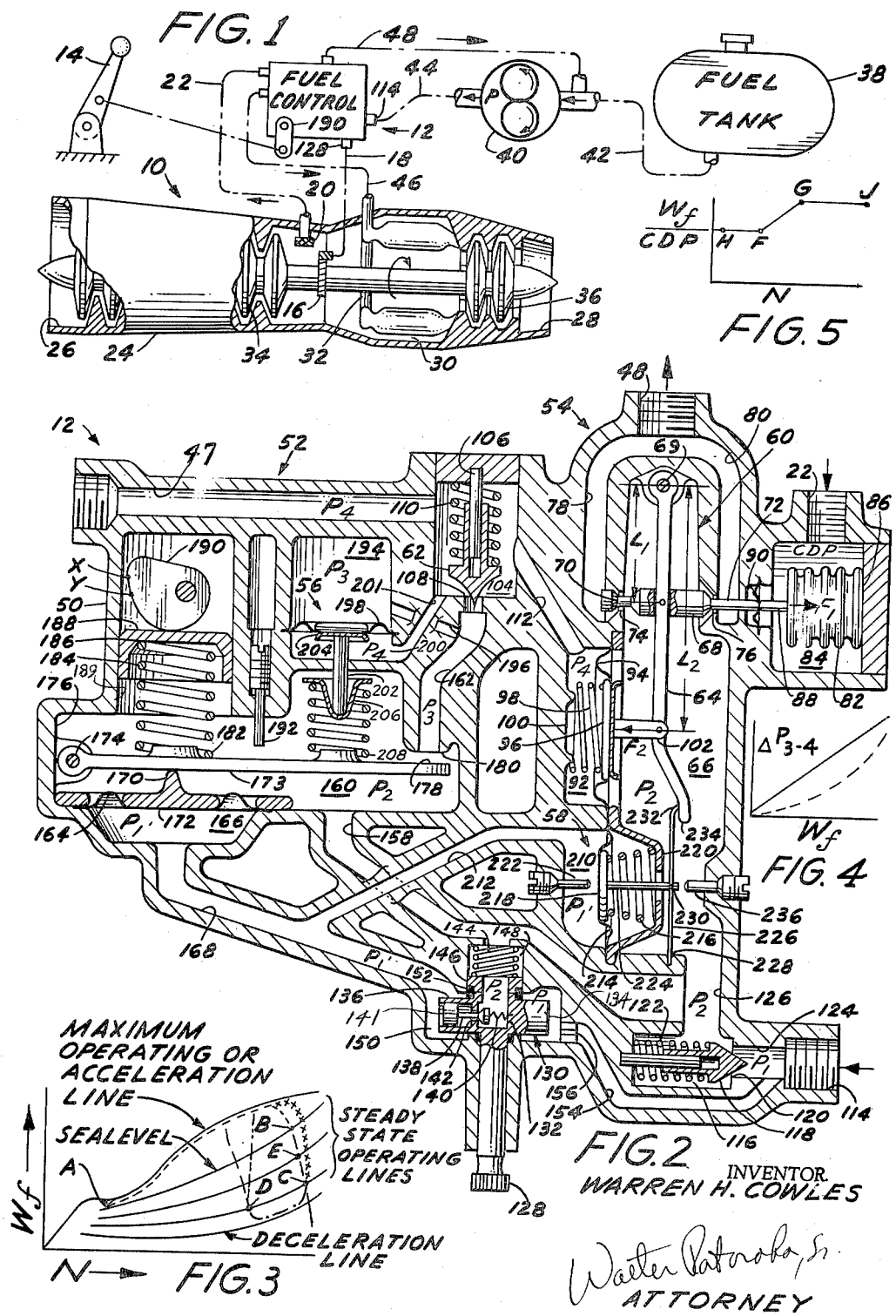

3,240,015
GAS TURBINE ENGINE FUEL CONTROL
Warren H. Cowles, Birmingham, Mich., assignor to Holley Carburetor Company, Warren, Mich., a corporation of Michigan
Original application Mar. 11, 1963, Ser. No. 264,117. Divided and this application Nov. 19, 1964, Ser. No. 412,437
12 Claims. (Cl. 60—39.28)

This application is a divisional of application Serial No. 264,117, filed on March 11, 1963, in the name of Warren H. Cowles, now abandoned.

This invention relates generally to fuel controls, and more particularly to closed-loop scheduling types of fuel controls for gas turbine engines.

It is well known that parameters of pressure, speed, and, if necessary, temperature may be used independently and/or collectively for controlling and determining the operation of gas turbine power plants. However, the means heretofore employed to sense these various parameters and to provide corresponding input signals or control forces have generally been rather complex, often involving squared factors.

This invention embodies a fuel valve design that eliminates having to cope with squared flow factors resulting from the restriction or orifice type flow usually employed in gas turbine engine fuel controls. The invention also embodies a novel direct coupling between the pneumatic pressure sensor and the bypass valve, producing various advantages over previously known systems.

Another object of the invention is to provide such a system wherein the reaction time or response to changes in the selected pneumatic pressure is immediate and, hence, much faster than in prior systems, due to the above mentioned direct coupling technique.

It is a further object of the invention to provide a fuel control device having a novel high pressure acceleration fuel system, wherein high pressure moving seals may be avoided and low pressure seals used in lieu thereof between the fuel and pneumatic chambers.

Other objects and advantages of the invention will become apparent when reference is made to the following specification and the accompanying drawings wherein:

FIGURE 1 is a schematic illustration of a gas turbine engine having connected thereto a fuel control constructed in accordance with the invention;

FIGURE 2 is a cross-sectional view of a complete fuel control embodying the invention;

FIGURE 3 is a graph illustrated generally the relationships of fuel flow to engine speed for engine operating conditions such as acceleration, steady state, and deceleration;

FIGURE 4 is a graph illustrating generally the relationship of fuel flow to pressure drop as would result in this system as compared to prior systems;

FIGURE 5 is a graph illustrating a characteristic of a fuel control embodying the invention.

Referring now in greater detail to the drawings, FIGURE 1 illustrates schematically a gas turbine engine 10 having a fuel control 12 which is responsive to manual control by means of a selector lever 14, to engine speed by means of a gear box 16 and transmission line 18, and to compressor discharge pressure via a pressure probe 20 and conduit 22.

While the fuel control 12 shown and to be described herein is responsive to particular parameters, it should be understood that certain novel features of the invention may be employed in a fuel control responsive to other parameters, such as temperature and engine pressures other than that specified herein. As to those features, no limitations are intended by the particular parameters employed in the present disclosure for purposes of illustration.

A typical gas turbine engine 10 includes an outer housing 24 with an intake 26 and exhaust nozzle 28. A combustion chamber 30 having a fuel distribution ring 32 therein is located within the housing 24 between the compressor 34 and turbine 36.

The fuel supply system generally comprises a fuel tank 38, an engine driven pump 40, and supply conduits 42 and 44 which deliver fuel to the fuel control 12. The fuel control 12 meters the correct fuel flow for the particular engine operating requirements, as dictated by the above mentioned engine speed and compressor discharge pressure parameters in a manner which will be described below. Correctly metered fuel is transferred to the fuel distribution ring 32 via a conduit 46, any excess fuel being by-passed back to the inlet side of the pump 40 via a return conduit 48, in a manner to be described.

As seen in FIGURE 2, the fuel control 12 comprises a plural cavity housing 50 formed in any suitable manner and containing an all-speed isochronous type governor system 52, an acceleration fuel system 54, a fuel reset device 56 and a speed bias device 58, the latter two devices being optional additives. The acceleration fuel system 54 includes a force balance system 60 operative in conjunction with a linear restrictor valve 62. These various components will now be described in detail.

Acceleration fuel system

A force balance lever 64 is pivotally secured to the fuel control housing in one of the chambers 66 therein. A valve stem 68 is pivotally connected to the lever arm 64, at a predetermined distance $L_1$ from the pivot point 69 of the lever 64, so as to be positioned substantially perpendicular to the arm 64. The ends of the valve stem 68 may, of course, be slidably confined within guide members (not shown). Two reduced diameter portions 70 and 72 formed on the stem 68 cooperate with a pair of annular openings or valve seats 74 and 76 formed within the housing 50 to function as a pair of valves. Outlet conduits 78 and 80 communicate with the openings 74 and 76, respectively, and converge into the single conduit 48 which returns to the inlet side of the pump 40.

An evacuated bellows 82 in another chamber 84 of the housing 50 is fixedly attached at its one end to a wall 86 of the housing 50, the other end thereof being secured to an extension 88 of the valve stem 68 for movement therewith. Compressor discharge air enters the chamber 84 via the conduit 22, and the pressure in chamber 84 is referenced to absolute zero by virtue of the bellows 82 being evacuated. A low pressure seal, which may be a diaphragm 90, is sufficient to separate the return line 80 from the air chamber 84.

A third chamber 92 is formed by sealing a recess formed in the wall of chamber 66 with a diaphragm 94. A washer 96 fastened in the usual manner to the diaphragm 94 serves as a seat for one end of a spring 98, the other end thereof seating against a wall 100 of the housing 50. A stem 102 extends from the washer 96 into the chamber 66 and is pivotally attached to the lever arm 64 at a second predetermined distance $L_2$ from the fixed pivot point 69.

A so-called linear restrictor valve 62 is located within still another chamber 104 formed within the housing 50. This valve 62 may slide along a fixed guide member 106 and be urged toward the valve seat 108 by the spring 110. A conduit 112 communicates between the chamber 104 and the chamber 92. The previously mentioned conduit 46, leading to the fuel distribution ring 32, communicates with chamber 104 of the fuel control unit 12 by way of the passage 47.

The fuel line 44 from the pump 40 enters the fuel control housing 50 at an inlet port 114. The chamber 116 contains a valve 118 urged toward the seat 120 by the spring 122. A passage 124 communicates between the inlet port 114 and the chamber 116. A passageway 126 communicates between the chamber 116 and the chamber 66.

Governing system

The transmission line 18 (FIGURE 1) is connected between a gear box 16 driven by the engine shaft and the shaft 128 extending from the fuel control housing 50. As seen in FIGURE 2, a hydraulic speed sensing unit 130 of a conventional centrifugal type is attached to the shaft 128 for rotation therewith. The speed sensing unit 130 may be substantially comprised of a generally tubular center portion 132 which has formed thereon or secured thereto a pair of radially extending members 134 and 136. The member 136 has an axial bore containing a centrifugal valve 138 which is normally urged open by the spring 140. The valve 138 is thus adapted to control fluid flow through port 142 which is formed within the member 136 in accordance with the speed of the engine 10.

A spring 144 and spring seat 146 located in a chamber 148 maintain a proper location of the members 134 and 136 within the generally cylindrical chamber 150, as the members 134 and 136 are rotated by the shaft 128 and transmission 18. A seal 152 prevents leakage or flow between the chambers 148 and 150, other than through passage 141 in the valve weight and the port 142. A conduit 154 containing a restriction 156 communicates between the conduit 124 and the chamber 150, while the valve 138 and chamber 148 serve to communicate between the chamber 150 and a passage 158 leading from the passage 126.

The valve 118 is provided to maintain a constant pressure drop across the port 142 resulting from flow changes other than those due to movement of the valve 138 in response to engine speed.

The fuel control unit 12 contains another chamber 160 providing communication between conduits 158 and 162. A diaphragm 164 forms a movable wall between the chamber 160 and still another chamber 166, and a conduit 168 communicates between the chambers 166 and 150. A member 170 extends from the diaphragm washer 172 into the chamber 160 so as to contact the lever arm 173, the latter being pivotally supported at its one end on a pivot pin 174 secured to wall 176 of the housing 50. The lever arm 173 includes a valving surface 178 adapted to engage the valve seat 180 at the inlet to the conduit 162. The movable spring seat 188 is slidably mounted in the cylinder 189 formed in the housing 50 for reciprocal actuation therein in response to the position of the rotatable cam 190 connected to the manual selector lever 14 (FIGURE 1). An adjustable minimum fuel flow stop 192 extends into the chamber 160 so as to limit the counter-clockwise movement of the lever arm 173.

Fuel reset device

When one is desired, a so-called fuel reset device 56 may be provided by forming a chamber 194, a conduit 196 communicating between conduit 162 and chamber 194, and a diaphragm 198 forming a movable wall between chamber 194 and another chamber 200. A passage 201 communicates between chamber 200 and the linear restrictor valve chamber 104. A stem 202 attached to the diaphragm washer 204 extends across the chamber 200 and into chamber 160. A spring seat 206 formed to receive the end of the stem 202 supports one end of spring 208, which urges the lever arm 173 in a clockwise direction so as to move the valving surface 178 away from the valve seat 180.

Speed bias device

When required by a particular engine, the speed bias device 58 may be provided by forming a chamber 210, a conduit 212 communicating between chamber 210 and conduit 168, and a diaphragm 214 forming a movable wall between the chamber 210 and chamber 66. A spring 216 is confined between the diaphragm washer 218 and a spring seat member 220 so as to urge the diaphragm 214 away from the chamber 66 toward an adjustable stop 222 extending into chamber 210.

A stem 230 extends from the diaphragm washer 218 and into the chamber 66, along the axis of spring 216. A leaf spring 226, fixedly mounted at its one end 228 on a wall of the housing 50, is attached at a point 230 intermediate the ends thereof to the end of the stem 224. The free end 232 of the leaf spring 226 at times contacts the free end 234 of the lever arm 64 to retard movement of the latter for a purpose to be described later. A second adjustable stop 236 serves to limit the movement of the leaf spring 226 against the lever arm 64.

Operation

Before explaining the operation of the fuel control 12 in detail, it is deemed advisable to first give a brief summary of its operation. As explained above, fuel from the tank 38 is supplied to the inlet 114 of the fuel control 12 by means of pump 40, which is usually (but not necessarily) driven by the engine and the capacity of which is more than sufficient to supply the total fuel requirement under any operating condition of the engine. The amount of fuel actually supplied to the engine is, of course, determined by the fuel control itself. From the inlet 114, fuel flows past valve 118, through passage 158, into chamber 160, past valve 178 and through the orifice 180, through passage 162, past valve 62, through passage 47 and then to the engine through conduit 46. It will thus be seen that all of the inlet fuel goes to the engine, except that fuel which is by-passed through passage 126, chamber 66, orifices 74 and 76, passages 78 and 80 and back to the inlet of the pump 40 through conduit 48.

The fuel supplied to the engine is controlled by the valve 178, in response to the movement of throttle 14 which rotates the cam 190 to load spring 184. The load on spring 184 is modulated by a pressure differential generated by the speed sense mechanism 130 and applied to diaphragm 164 and by the pressure differential across valve 62, the latter differential being an indication of instantaneous fuel flow and applied across diaphragm 198 so as to be resiliently transmitted to lever 173 by spring 208.

Inlet fuel which is not supplied to the engine but returned to the pump 40 is by-passed through orifices 74 and 76 controlled by valve member 68 according to a balance of moments about pivot 69. The primary balance is between the compressor discharge pressure acting on evacuated bellows 82 in opposition to the pressure differential between chamber 66 and outlet passage 47 applied to diaphragm 94, the balance being shifted between limit stops 222 and 236 by the pressure differential generated by the speed sense mechanism 130 acting across diaphragm 214 and resiliently applied to the lever 64 through the leaf spring 226.

It may also be advantageous to first describe generally the operation of the basic closed-loop moment balance system 60 and the effect of the novel linear restrictor valve 62. For this purpose, it can be assumed that the system 60 is in equilibrium and that the compressor discharge pressure decreases for some reason or other that is not important in this discussion. With that assumption in mind and referring to FIGURE 2, it can be seen that as the valve stem 68 and the attached lever arm 64 move to the left in response to a decrease in compressor discharge pressure surrounding the evacuated bellows 12, more fuel is by-passed through the ports 74 and 76, passages 78 and 80 and ultimately to the inlet of the pump 40 through the conduit 48. This results in a decrease in pressure in the chamber 66 and in the conduits 126, 158 and 162, as well as a reduced fuel flow to the engine. The linear restrictor valve 62 is then urged toward a more nearly closed position by the spring 110, resulting in a decrease in pressure in conduit 112 and the chamber 92 to the left of the diaphragm 94.

Ignoring for the moment the governing system valve 178/180 and considering pressure $P_2$ in chamber 160 to be substantially the same as pressure $P_3$ in passage 162, it can be seen from the solid straight line curve of FIGURE 4 that the pressure differential $P_2$–$P_4$ will decrease lineally as fuel flow $W_f$ decreases. This linear relationship is achieved by suitably contouring valve 62. Since the force $F_1$ was reduced due to the decrease in compressor discharge pressure, the reduced $P_2$–$P_4$ differential, which produces a lesser force $F_2$ than before the additional fuel was by-passed, and the constant force of the calibrated spring 98 results in a return of the moment balance system back to equilibrium. In other words, a reduction in force $F_1$ eventually results in a reduction in force $F_2$ so as to return the system to equilibrium. The term "closed-loop" is commonly applied to this type of equilibrium seeking moment balance system, and the above type of operation takes place whenever anything occurs to throw the system out of balance.

If a fixed restriction were employed in lieu of the linear restriction valve 62, as has been the common practice heretofore, equilibrium could still be obtained; however, a much more complicated system of diaphragms, levers, and/or springs would be required for use in conjunction with the acceleration fuel lever 64, as will become more apparent later in the description.

The detailed operation of the fuel control unit 12 will now be discussed in conjunction with a typical fuel flow ($W_f$) vs. speed (N) curve (FIGURE 3) illustrating the various engine operating conditions, without regard, at this point, to the optional fuel reset device 56 and speed bias device 58.

It will first be assumed that the engine 10, and consequently the pump 40, has been started and that the fuel control unit 12 is receiving fuel, at a pressure $P_1$, from the pump 40 through the inlet port 114. For purposes of illustration, the engine idle operating conditions are represented by point A of FIGURE 3. At this time, the pressures within the fuel control unit 12 would be as indicated by FIGURE 2, i.e., there would be a pressure drop across the valve 118 resulting in a pressure $P_2$ in the chamber 116, the conduit 126, and the chamber 66. There would be a further pressure drop across the valve seat 178/180 producing $P_3$ in the conduit 162. An additional pressure drop would take place across the valve 62, resulting in fuel at a pressure $P_4$ supplied to the engine 10, as well as in the conduit 112 and the chamber 92.

Under the above circumstances, the system would be in a steady state or equilibrium condition; that is, the compressor discharge pressure, hereinafter referred to as CDP, would have compressed the evacuated bellows 82 resulting in a force $F_1$ to the right (FIGURE 2) so as to produce a moment balance about the lever arm 64 of $$F_1 \times L_1 = F_2 \times L_2$$

the force $F_2$ resulting from the $P_2$–$P_4$ relationship in the chambers 66 and 92, less the force of the spring 98. As illustrated in FIGURE 2, $L_1$ and $L_2$ may be any predetermined lengths along the lever arm 64.

A particular amount of fuel would now be by-passed, through the conduits 78, 80 and 48, back to the pump 40 inlet.

Prior to take-off, the manual selector lever 14 would be pivoted so as to rotate the cam 190 in a counterclockwise direction until some point X is in contact with the spring seat 188. Looking again at FIGURE 3, the result of moving lever 14 would be an acceleration, which is a transient or non-equilibrium condition, along the dotted curve toward some equilibrium or steady state point B on the sea level curve. During this transient condition, the spring seat 188 would have been moved downwardly, compressing the spring 184 and instantaneously rotating the lever arm 173 and its valving surface 178 completely away from the valve seat 180 to some maximum stop, the stop being determined either by the limit of movement of stem 170 downwardly against the pressure $P_1'$ or by some definite fixed stop similar to stop 192. Since the pressure $P_1$ from the pump 40 would increase with the increasing speed, $P_2$ would now be higher, and, with the lever arm 173 away from the seat 180, $P_3$ would be substantially equal to $P_2$, allowing more fuel to flow past the linear restrictor valve 62 and to the engine 10. At the same time, $P_4$ would have increased in the chamber 104, conduit 112 and the chamber 92. However, because of the contoured shape of the valve 62 and as illustrated by FIGURE 4, a higher pressure differential $P_2$–$P_4$ would have resulted across the diaphragm 94, thereby overcoming the spring 98 to move the lever arm 64 to the left in FIGURE 2. The valve 68 would thus move toward a more open position so as to bypass more fuel through the conduits 78, 80 and 48. In the meantime, however, CDP would have increased in the chamber 84, thereby tending to compress the evacuated bellows 82 and restrict the bypass flow through the ports 74 and 76.

As the speed increases, pressure $P_1$ would likewise have been increased, as would the $P_1'$–$P_2$ differential originally established by the valve 118. This would move the diaphragm 164 and stem 170 upwardly, thereby positioning the valving surface 178 of the lever arm 173 closer to the seat 180, until such time as the upward movement of lever 173 is counteracted by the force of the spring 184 on the lever arm 173. This would throttle or reduce the fuel flow from the chamber 160 into the conduit 162 and, in turn, reduce $P_4$ in the chambers 104 and 92. Because of the actuation of the valve 178/180, and as a result of the decreased flow $W_f$ past the valve 62, the pressure differential $P_2$–$P_4$ across the diaphragm 94 would once again have decreased, on a line somewhere between the solid and dotted lines of FIGURE 4. This and the force of the spring 98 would move the diaphragm 94, and hence the lever arm 64, toward the right in FIGURE 2. The valve stem 68, being affixed to the lever arm 64, would also move to the right, until balanced by the effect of CDP on the evacuated bellows 82. Since the above operation is at sea level, the resultant balanced condition would be represented by point B on the sea level curve of FIGURE 3.

Once the aircraft has taken off and while climbing to some altitude which is represented by point C in FIGURE 3, CDP will continually decrease, permitting the valve stem 68 to move toward the left in FIGURE 2. This will by-pass more fuel through the conduits 78, 80 and 48 and to the pump 40 inlet, causing a reduction of pressure $P_2$ in chamber 66, conduits 126 and 158 and the chamber 160. $P_3$ would decrease, permitting the spring 110 to force the linear restrictor valve 62 toward the seat 108, thereby reducing the flow through the conduit 46 to the engine 10, and at the same time reducing pressure $P_4$ in the chambers 104 and 92. The $P_2$–$P_4$ differential would, of course, be lowered with decreased fuel flow, permitting the acceleration fuel system 54 to once again come to an equilibrium condition.

Steady state or equilibrium operation represented by point C in FIGURE 4 would be maintained until such time, for example, as it would be desired to decrease speed. Decreasing speed would be accomplished by moving selector lever 14 in the opposite direction so as to rotate cam 190 clockwise from X to Y, thereby lowering the pressures throughout the system, increasing by-pass fuel flow and decreasing fuel flow to the engine, all of which is the reverse of what happened when cam 190 was first moved to X. The above would result in a deceleration from point C to point D, along the dot-dash line of FIGURE 3, the precise deceleration line being determined by the setting of the minimum flow stop 192.

Acceleration from point D to a greater speed at a different altitude, such as indicated by point E, would be along the dash-double dot line to the dotted acceleration line, and then along the dotted line past B to E.

From the above description, it will be apparent that a fuel control embodying the invention is adapted for use with any gas turbine engine having operating conditions typically represented by curves such as those shown by FIGURE 3.

While the over-all operation described above is very generally similar for many prior fuel control systems, the invention embodies certain specific novel features which produce a much quicker, less cumbersome and more accurate response than is generally obtained. For example, since the linear restrictor valve 62 is deliberately contoured so that the area defined by seat 108 varies directly with the square root of the pressure drop, the linear relationship referred to above (see FIGURE 4) between metered fuel flow and the pressure drop $P_3-P_4$ across the valve 62 is produced. This is in contrast with conventional flow through restrictions commonly used in prior art fuel controls and resulting in a pressure drop which is proportional to the square of the fluid flow therethrough. For example, the change in pressure across an orifice may be proportional to $(W_f+q)^2$ or $W_f^2+2qW_f+q^2$, wherein $q$ is simply "computer fuel" used for hydraulic multiplication and returned to the pump. Because the flow through the usual orifice or restriction is non-linear, as illustrated by the dotted line curve of FIGURE 4, prior art fuel control devices require a more complicated system of diaphragms, levers and/or springs to be used in the acceleration system lever or other structure in order to cancel out the squared factors ($W_f^2$ and $q^2$) and leave only $W_f$ as the fuel flow to the engine.

Another novel feature incorporated in the above described acceleration fuel system 54 is the direct connection between the by-pass valve 68 and the pneumatic pressure sense 82. This produces an immediate response to CDP changes, as opposed to the usual indirect linkages and conduitry systems prevalent in the heretofore known fuel control units. Additionally, since the by-pass valve 68 drops the pressure from the high pressure $P_2$ to pump inlet pressure, a simple low pressure seal, such as the movable diaphragm 90, may be used between the fuel passage 80 and the air in the chamber 84. Thus, the usual high pressure seal required in prior art devices is avoided. The result is a greatly improved operation because bellows 82 is free to operate quickly and accurately, there being no friction load on stem 88.

Fuel reset device 56 is incorporated in the governing system 52 when isochronous governing characteristics are desired. Referring again to FIGURE 2, it can be seen that the pressure above the diaphragm 198 in the chamber 194 is always greater than that below the diaphragm 198 in the chamber 200 due to the pressure drop across the valve 62. It is thus apparent that the fuel flow to the engine at a given speed, would be greater with a fuel reset device 56 in the system than would be the case without such a device, since the valving surface 178 of the lever arm 172 would be maintained farther away from the seat 180. The practical effect of this fuel reset device 56 is isochronous governing, represented by the X-line in FIGURE 3 leading from the acceleration curve to some point, such as C; without device 56, governing would be such as that indicated by the shallower dotted line leading to point C through points B and E. The ease with which this effect is accomplished is greatly facilitated by the controlled pressure drop across the linear restrictor valve 62.

One gas turbine engine specification sometimes required to be considered is, in effect, a plot of $W_f/CDP$ vs. N (speed). Some engines, for example, require a constant $W_f/CDP$ ratio over the entire speed range; other engines require a varying ratio such as that shown in FIGURE 5 wherein the ratio is greater at higher speeds.

The function of the speed bias device 58, which may be added to the acceleration fuel system 54 when desired, is to provide the effect shown in FIGURE 5. Whether the effect of device 58 is to be applied to the force balance system 60 over the complete speed range or some portion thereof may be controlled by changing the preload of spring 216 and/or by adjusting the stops 222 and 236.

From FIGURE 2, it can be seen that the pressure differential $P_1'-P_2$ will increase as the speed sensor valve 138 closes with increasing speed. Since this same pressure differential is applied across diaphragm 214, it is evident that the effect of the increased $P_1'-P_2$ is to move the diaphragm 214 to the right in FIGURE 2 so as to increase the force of leaf spring 226 acting on the end 234 of the lever 64. Even though CDP is continually increasing with increased speed, the increased force of the leaf spring 226 on the lever 64 provides the same effect as if CDP were increasing at some greater rate, so as to move valve 68 farther to the right and reduce the amount of fuel by-passed through ports 74 and 76, passages 78 and 80 and conduit 48. This increases the fuel flow to the engine, $W_f$, accordingly. The above effect is illustrated by the line F-G in FIGURE 5.

It is apparent that a constant $W_f/CDP$ ratio would be maintained, despite increased speed, any time that the stem 224 to which the leaf spring 226 is fixed engages the adjustable stop 236. This is represented by the line G-J, FIGURE 5. Similarly, a constant $W_f/CDP$ ratio would be maintained at lower speeds, line H-F of FIGURE 5, so long as $P_1'-P_2$ is low enough so that the leaf spring 226 does not exert a force on the lever arm 64.

From the above discussion, it is apparent that the invention provides a compact and efficient fuel control device having a number of novel features resulting in greater accuracy, faster response and fewer parts as compared to prior art devices. It should also be apparent that the use of the device disclosed herein is not limited to aircraft gas turbine engines.

It should be further apparent that the invention provides a novel direct connection means between the usual pneumatic pressure sensor and the acceleration fuel system lever arm, with the connector serving as a by-pass valve and operating in such a manner that an immediate response to the selected pressure results. This produces a considerable advantage over the indirect linkage and complicated conduitry systems which have been prevalent in previously known fuel control systems.

Although but one embodiment of the invention has been disclosed and described, it is apparent that other modifications may be made within the scope of the appended claims.

What I claim as my invention is:

1. A fuel control mechanism for a gas turbine engine including a compressor, said fuel control mechanism comprising a source of fuel under pressure, an inlet port for said fuel; an outlet port; a conduit communicating therebetween; first valve means in said conduit operable to control fuel flow; and a closed-loop moment balance system for regulating the flow through said conduit, said system including a lever and a bypass valve means, said bypass valve means including a valve, a valve stem, a second outlet from said conduit, and a passageway communicating between said second outlet and said source of fuel, said stem being pivotally connected to said lever at substantially right angles thereto, a first device responsive to a selected compressor pressure and fixedly attached to said valve stem, and a second device responsive to the difference in fuel pressure across said first valve means and pivotally connected to a second point along said lever.

2. A fuel control mechanism for a gas turbine engine including a compressor, said fuel control mechanism comprising a source of fuel under pressure, an inlet port for said fuel; first and second outlet ports; separate conduits communicating between said inlet port and each of said outlet ports; first valve means in said conduit leading from said inlet port to said first outlet port; and a closed-loop acceleration fuel system for regulating the flow through said conduits, said system including a lever and bypass valve in said conduit leading from said inlet port to said second outlet port, said bypass valve including a stem having a contour formed thereon for coaction with said second outlet port, said stem being pivotally connected to said lever at substantially right angles thereto, a first device responsive to a selected compressor pressure and fixedly attached to said stem, and a second device responsive to the difference in fuel pressure across said first valve means and pivotally connected to a second point along said lever, said second pressure responsive device forming a movable wall between the fluid in said second conduit and the fluid in said first conduit downstream of said valve means.

3. In combination with the device described in claim 2, a governor system having a second valve means in said conduit leading from said inlet port to said first outlet port.

4. A device as described in claim 3, and including additionally a third pressure responsive device for at times influencing said second valve means, said device being responsive to the difference in fuel pressure across said first mentioned valve means.

5. A fuel control mechanism, comprising a housing; a source of fuel under pressure; a fuel inlet port; a source of air under pressure; a fuel outlet port; a fuel bypass port; an air inlet port; a first passageway communicating between said fuel inlet port and said fuel outlet port; a second passageway communicating between said fuel inlet port and said fuel bypass port; and an acceleration fuel system for influencing the amount of flow through said outlet and said bypass ports, said acceleration fuel system including first valve means in said first passageway, second valve means in said second passageway, said second valve means including a valve and a valve stem, said valve stem cooperating with said fuel bypass port, the movement of said valve and valve stem being responsive to the pneumatic pressure entering said housing through said air inlet, a lever arm pivotally connected to said stem at a point intermediate the ends thereof and pivotally connected at one of said ends to said housing, and a device responsive to the difference in fuel pressure across said first valve means and pivotally connected to said lever substantially near the other end thereof.

6. In a fuel control for a gas turbine engine including a compressor, said fuel control having a housing, a source of fuel under pressure, an inlet port for said fuel, an outlet port, and a closed-loop communication system including a main fuel passage therebetween, an acceleration fuel system for regulating the flow through said main fuel passage, said acceleration fuel system comprising a moment balance system including valve means for bypassing fuel, said valve means including a valve stem, a valve formed thereon, an opening operatively connected to said main fuel passage and a conduit communicating between said opening and said source of fuel, a lever pivotally connected at its one end to said housing and being operably connected to said valve stem at a point intermediate the ends thereof, a first device responsive to a selected compressor pressure and fixedly attached to one end of said valve stem, a second valve means in said main fuel passage for maintaining a linear relation between metered fuel flow and pressure drop thereacross, a second pressure responsive device operably connected substantially near the other end of said lever, and a conduit communicating between said second pressure responsive device and a point intermediate said second valve means and said outlet port.

7. A fuel control system for a gas turbine engine including a compressor, said fuel control system comprising a housing, a source of fuel under pressure, an inlet port for said fuel, an outlet port, a conduit communicating therebetween, a first chamber in communication with said conduit, a lever and bypass valve means in said first chamber, said bypass valve means including a stem, a valve formed thereon, an opening in said chamber adjacent said valve and a passage communicating between said opening and said source of fuel, said lever being pivotally supported at its one end in said housing and being operably connected to said stem at a fixed distance from said pivotally supported end, a second chamber containing a device responsive to a selected compressor pressure, said pressure responsive device being fixedly attached to said stem, seal means between said first and second chambers surrounding a part of said stem, second valve means in said conduit for maintaining a linear relation between metered fuel flow and pressure drop across said second valve means, and a second pressure responsive device operably connected to said lever at a second fixed distance from said pivotally supported end, said second device being operatively connected to said second valve means so as to be responsive to the difference in fuel pressure across said second valve means and forming a movable wall between said first chamber and a third chamber.

8. An acceleration fuel system comprising a source of fuel under pressure, an inlet port for said fuel; an outlet port; a closed-loop communication system including a main fuel passage therebetween, said closed-loop communication system including a source of air under pressure, a valve means for bypassing fuel, said valve means including a stem having reduced diameter portions formed at two points thereon and a pair of coacting valve seats, a lever pivotally supported at its one end and being pivotally connected to said stem fixed distance from said pivotally supported end so as to be movable therewith, a first device responsive to said air pressure and fixedly attached to one end of said stem, and a second pressure responsive device operably connected to said lever at a second fixed distance from said pivotally supported end; a linear restrictor valve in said main fuel passage for maintaining a linear relation between metered fuel flow and pressure drop across said restrictor valve; and a means of communication between said second pressure responsive device and a point intermediate said linear restrictor valve and said outlet port.

9. In a fuel control for a gas turbine engine, including a housing and a fuel passage therethrough, a source of fuel under pressure, an acceleration fuel system for regulating the flow through said passage, said system comprising a first chamber in said housing, a lever arm in said first chamber pivotally attached at its one end to said housing, a source of air under pressure, a second chamber in said housing for receiving said air, a device in said second chamber fixedly attached at its one end to said housing and being responsive to said air pressure, a bypass valve means pivotally attached to said lever arm, said bypass valve means including a stem having reduced diameter portions formed on the ends thereof for coaction with a pair of seats, said seats surrounding two outlets from said first chamber, one of said ends being fixedly attached to said pressure responsive device, a second pressure responsive device pivotally atached to said lever arm substantially near the other end thereof, said second pressure responsive device forming a movable wall between said first chamber and a third chamber, a first resilient means located in said third chamber for urging said second pressure responsive means toward the first chamber, a second valve means in said fuel passage for maintaining a linear relationship between metered flow through said passage and the pressure drop across said second valve means, said second valve means including a contoured valve, a valve seat formed in said fuel passage and a second resilient means for urging said contoured valve toward said valve seat against the force of the fluid flow therethrough, and a conduit communicating between said third chamber and said fuel passage downstream of said second valve means, said second pressure responsive device being responsive to the difference in fuel pressure across said second valve means.

10. In a fuel control mechanism for a gas turbine engine including a compressor, said fuel control mechanism having a source of fuel under pressure, an inlet port for said fuel, an outlet port, a passageway communicating therebetween and fuel metering means in said passageway, a closed-loop moment balance system for regulating the flow through said passageway, said system comprising first means responsive to a selected compressor pressure and second means pivotally connected to said first means for bypassing variable amounts of said fuel back to said source in response to movement of said first means, said second means including a pair of openings formed in said passageway upstream of said fuel metering means, a valve stem pivotally connected to said first means, a pair of reduced diameter portions formed on said valve stem, and a conduitry system communicating between said openings and said source of fuel.

11. In a fuel control mechanism for a gas turbine engine including a compressor, said fuel control mechanism having a source of fuel under pressure, an inlet port for said fuel, an outlet port, a passageway communicating therebetween and fuel metering means in said passageway, a closed-loop moment balance system for regulating the flow through said passageway, said system comprising first means responsive to a selected compressor pressure, second means responsive to the pressure differential across said fuel metering means, and third means operably connected to said first and second means for variably bypassing said fuel back to said source in response to movement of said first and second means, said third means including a stem having a pair of reduced diameter portions formed thereon, a pair of openings formed in said passageway for cooperation with said reduced diameter portions, and a conduitry system comunicating between said openings and said source of fuel.

12. A fuel control mechanism, comprising a housing; a source of fuel under pressure; a fuel inlet port; a source of air under pressure; a fuel outlet port; a fuel bypass port; an air inlet port; a first passageway communicating between said fuel inlet port and said fuel outlet port; a second passageway communicating between said fuel inlet port and said fuel bypass port; and an acceleration fuel system for influencing the amount of flow through said outlet and said bypass ports, said acceleration fuel system including first valve means in said first passageway, second valve means in said second passageway, said second valve means including a valve and a valve stem, said valve stem cooperating with said fuel bypass port, the movement of said valve and valve stem being responsive to the pneumatic pressure entering said housing through said air inlet, a lever arm pivotally connected to said stem at a point intermediate the ends thereof and pivotally connected at one of said ends to said housing, a pressure responsive device pivotally connected to said lever substantially near the other end thereof and a conduit communcating between said pressure responsive device and said first passageway downstream of said valve means.

References Cited by the Examiner
UNITED STATES PATENTS

| 2,636,553 | 4/1953 | Ballantyne. | |
| 2,871,659 | 2/1959 | Chamberlin. | |
| 2,943,447 | 7/1960 | Davies. | |
| 3,068,648 | 12/1962 | Fleming. | |
| 3,073,329 | 1/1963 | Kast | 60—39.28 X |
| 3,076,310 | 2/1963 | Gayfer | 60—39.28 |
| 3,078,669 | 2/1963 | Williams | 60—39.28 |
| 3,118,491 | 1/1964 | Simons | 60—39.28 X |

JULIUS E. WEST, *Primary Examiner.*

MARK NEWMAN, *Examiner.*